Figure 1:
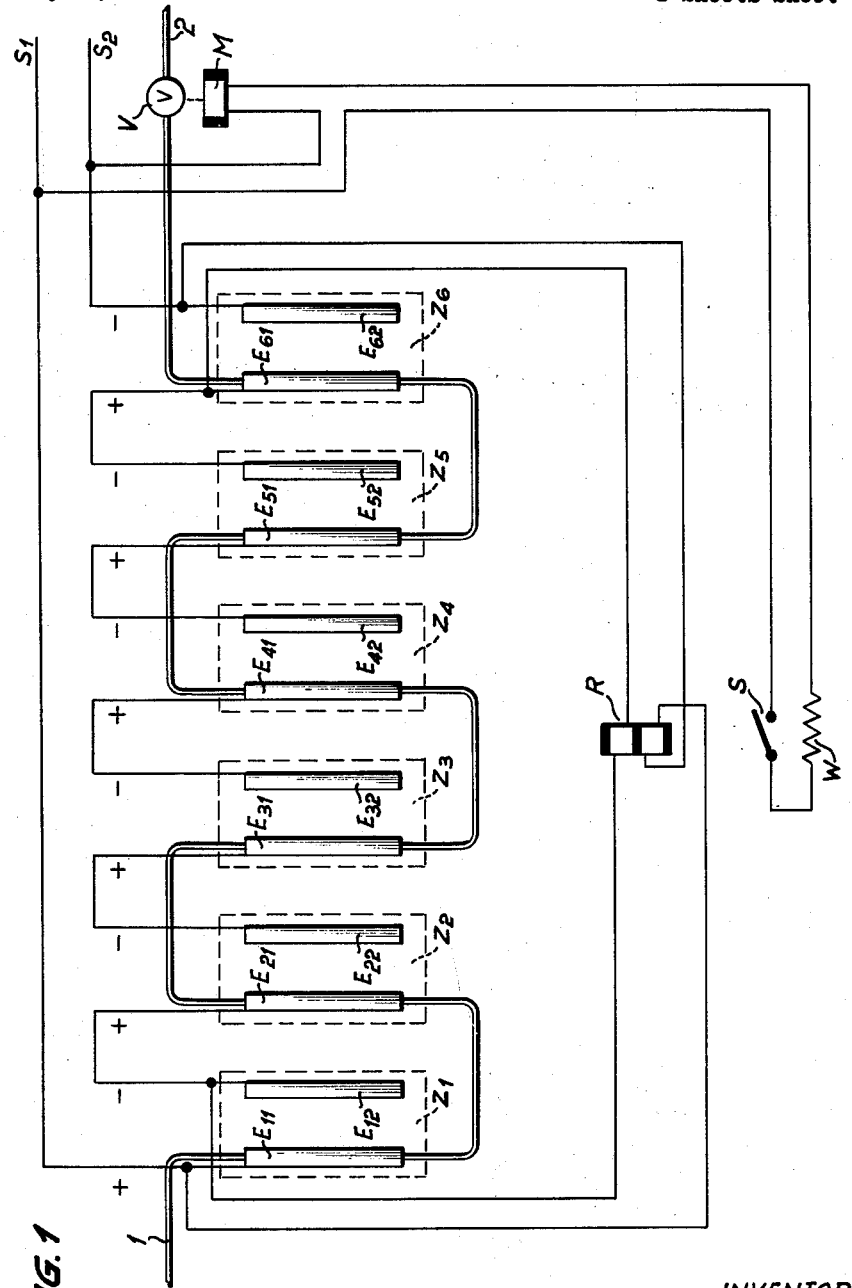

INVENTORS
EDUARD JUSTI
AUGUST WINSEL
BY

ATTORNEYS

June 14, 1966  E. JUSTI ETAL  3,256,116
PROCESS FOR OPERATING A FUEL BATTERY HAVING AT LEAST TWO
SERIES-CONNECTED CELLS USING REACTION GAS
CONTAINING INERT GAS
Filed July 19, 1961  3 Sheets-Sheet 2
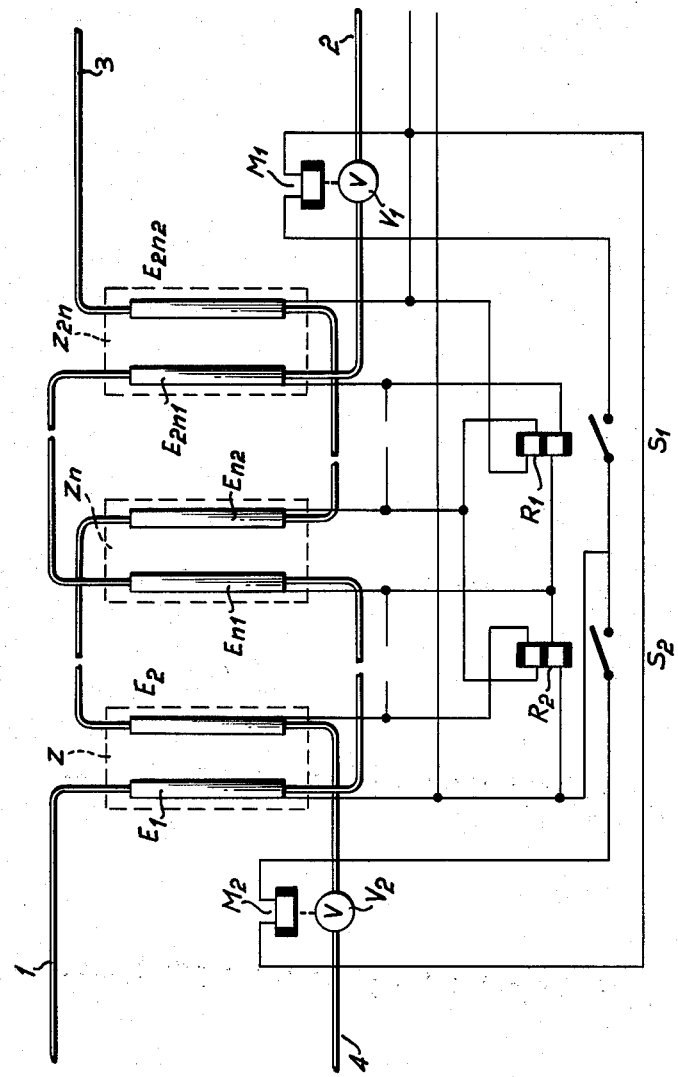
INVENTORS
EDUARD JUSTI
AUGUST WINSEL
BY
ATTORNEYS

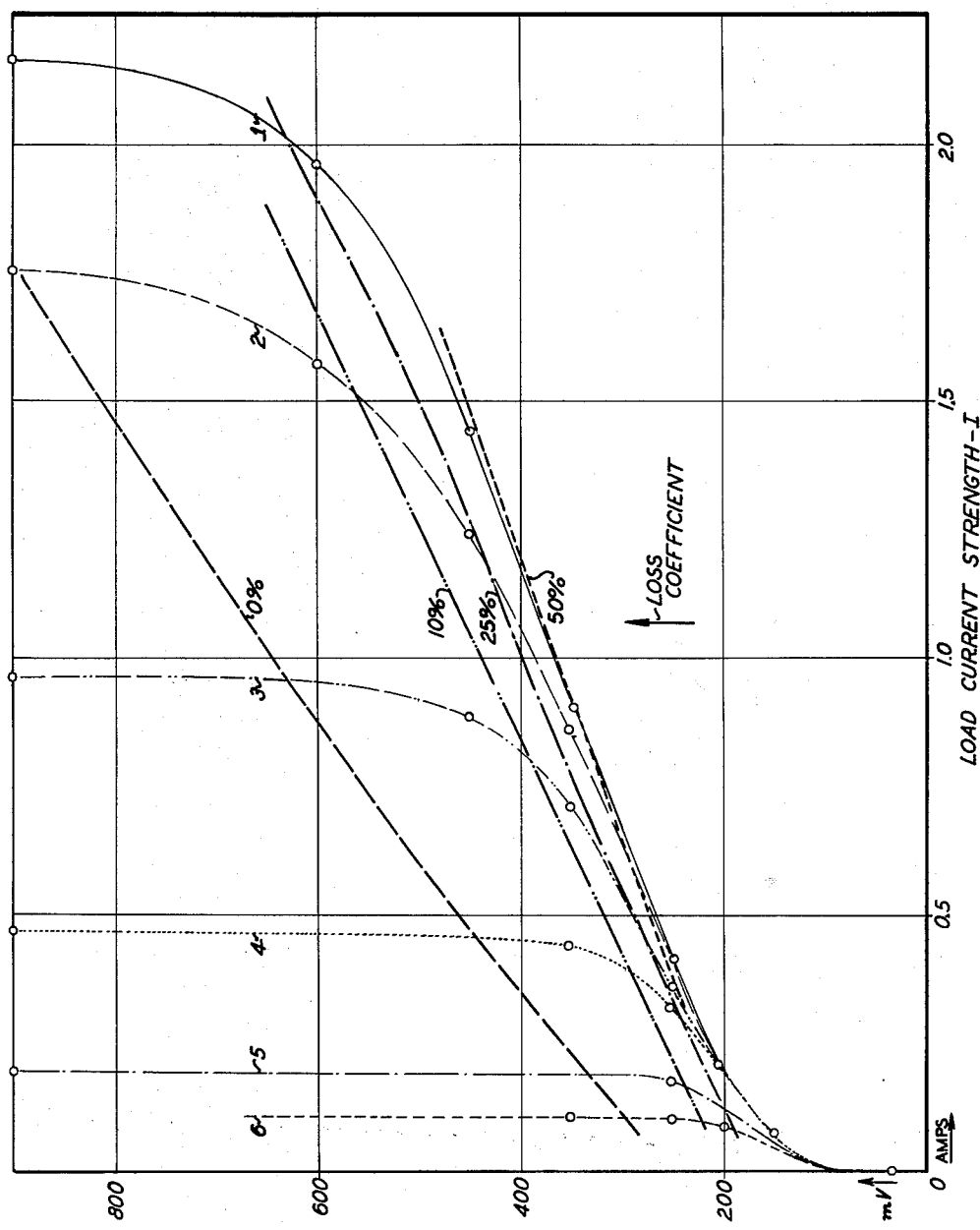

United States Patent Office 3,256,116
Patented June 14, 1966

1

3,256,116
PROCESS FOR OPERATING A FUEL BATTERY HAVING AT LEAST TWO SERIES-CONNECTED CELLS USING REACTION GAS CONTAINING INERT GAS
Eduard Justi and August Winsel, Braunschweig, Germany, assignors to Siemens-Schuckert-Werke Aktiengesellschaft, Berlin, Germany, and Varta Aktiengesellschaft, Hagen, Westphalia, Germany, both corporations of Germany
Filed July 19, 1961, Ser. No. 125,268
Claims priority, application Germany, July 21, 1960,
R 28,380
22 Claims. (Cl. 136—86)

The present invention relates to a process for operating fuel batteries having at least two series-connected cells using reaction gases containing inert gases, and more particularly to such a process wherein the gas is passed successively in series through the gas diffusion electrodes corresponding to the particular reaction gas to be electrochemically converted.

In converting chemical energy into electrical energy by reversible oxidation of fuel gases, such as for example in galvanic fuel cells, it has been observed that the voltage and current supply of the gas electrodes decrease after a relatively short period of operation. Such decreases had been attributed to a decrease in catalytic activity of the electrodes used due to the poisoning thereof by contaminants found in technically pure hydrogen.

Nevertheless, further experiments indicated that the decrease in output of gas diffusion electrodes fed with contaminated gases, such as technically pure hydrogen or oxygen, was actually by no means due to poisoning of the catalyst portions of the electrodes, but that instead pressure pockets or cushions of inert gases were left before and within the porous electrodes as a consequence of the electrochemical conversion of such gases, i.e. hydrogen and oxygen. Even where the inert gases are gases such as nitrogen or argon, which cannot be considered as catalyst poisons, the voltage of the electrodes declines due to suffocation of the catalytic surface by the inert gas. Accordingly, corrosion or poisoning of the electrodes can only be considered as a secondary phenomenon.

It is known that fuel gas electrodes can be operated over a long service life if the inert gas pressure pockets or cushions which accumulate are blown out as the cell voltage decreases, or if a certain amount of the fuel gas or of the oxidizing gas, as the case may be, is allowed to emerge continuously into the atmosphere, thus rendering the overall process less efficient due to the loss of a portion of the fuel gas or oxidizing gas.

It is an object of the present invention to overcome the foregoing disadvantages and to provide a process for operating a fuel battery having cells equipped with gas diffusion electrodes such that the gas to be reacted is passed successively in series through the corresponding electrodes of the various cells.

Another object of the invention is to provide a process for the electrolytic selective separation of an electrolytically convertible reaction gas from a mixture thereof with a gas constituent which is inert to electrochemical conversion.

Other and further objects of the invention will become apparent from a study of the within specification and accompanying drawing in which:

FIGURE 1 is a schematic view of a fuel battery having a plurality of series connected cells for carrying out the process of the invention, and FIGURE 2 is a schematic view of a battery having cells connected in series for permitting the separate passage of a fuel gas as well as an oxidizing gas through the corresponding electrodes therefor in succession in accordance with an alternate embodiment of the invention.

FIGURE 3 is a graph showing the utilization of oxygen in a battery according to the invention.

It has been found, in accordance with the present invention that a process may be provided for operating, with an inert gas-constituent-containing reaction gas, a fuel battery having cells equipped with gas diffusion electrodes corresponding to the reaction gas to be electrochemically converted, which comprises passing the inert gas-constituent-containing reaction gas successively in series through the corresponding gas diffusion electrodes of at least two series-connected cells. Fresh inert gas-constituent-containing reaction gas is fed conveniently to the corresponding electrode of the first cell and the remaining inert gas-constituent-containing reaction gas passing from the corresponding electrode of a preceding cell is fed to the corresponding electrode of the next cell in the series, while the thereby accumulated inert gas constituents passing from the corresponding electrode of the last cell are removed, and if desired recovered.

The corresponding electrodes may take the form of anodes wherein the reaction gas will be a fuel gas, while the corresponding electrodes may also take the form of cathodes wherein the reaction gas will be an oxidizing gas. It will be appreciated that the inert gas constituents which accumulate may be removed continuously or intermittently.

Since the content of accumulated inert gas constituents will vary in direct proportion to the degree of polarization of the corresponding electrode of the last cell, such content may be readily removed upon the reaching of a predetermined polarization degree. Such removal may take place automatically in direct dependence upon the reaching of such predetermined polarization degree. Significantly, the content of accumulated inert gas constituents may be removed in direct dependence upon the polarization deviation between the polarization of the corresponding electrode of the last cell of the series and the corresponding electrode of a preceding cell in the series, where all of the electrodes have the same current density. Therefore, the content of accumulated inert gas constituents may be effectively removed upon reaching a predetermined polarization deviation in an automatic manner. Furthermore, the polarization deviation may be measured in terms of the voltage difference with the aid of a reference electrode interposed before the corresponding electrode of the last cell and another reference electrode of the same type interposed before the corresponding electrode of a preceding cell in the series. The reference electrodes are always interposed in known manner before the electrode to be measured in the same cell and connected therewith to a galvanic element. The galvanic contact can be realized by a Luggin capillary, a siphon with capillary opening containing an electrolyte solution (see, G. Milazzo, Elektrochemie, Springer-Verlag, Wien, 1952, page 130, where devices for measuring electrode potentials are described).

If the polarization of two electrodes is to be compared, with the aid of identical reference electrodes interposed before each of the respective electrodes, the voltages of the two electrodes against their reference electrodes can be compared.

The cell current does not flow through the reference electrodes. Of course, the polarization deviation may be measured, as well, in terms of the voltage difference measured between two of the cells of the series in the battery rather than by means of reference electrodes.

In accordance with the preferred embodiment of the invention a process is provided for operating with inert gas-constituent-containing reaction gases, a fuel battery having cells equipped with gas diffusion electrodes for the oxidizing gas as well as gas diffusion electrodes for the fuel gas. Thus, the inert gas-constituent-containing fuel gas may be passed successively in series through the gas diffusion anodes of at least two series connected cells, whereby fresh-inert gas-constituent-containing fuel gas is fed to the anode of the first cell and remaining inert gas-constituent-containing fuel gas passing from the anode of a preceding cell will be fed to the anode of the next cell in series. The thereby accumulated inert gas constituents passing from the anode of the last cell may accordingly be removed and/or recovered. In the same way, the inert gas-constituent-containing oxidizing gas may be passed successively in series through the gas diffusion cathodes of the connected cells whereby fresh inert gas-constituent-containing oxidizing gas will be fed to the cathode of the first cell and the remaining inert gas-constituent-containing oxidizing gas passing from the cathode of a preceding cell will be fed to the cathode of the next cell in series. Similarly, the thereby accumulated inert gas constituents passing from the cathode of the last cell may be readily removed and/or recovered as desired.

In accordance with an alternate embodiment of the invention, the direction of the flow of gas passing through the cathodes of the series-connected cells of the fuel battery is opposite to the direction of flow of the gas passing through the anodes of the cells.

Of course, the content of inert gas constituents both in the case of the oxidizing gas and the fuel gas, may be effectively removed in direct dependence upon the polarization derivation between the polarization of the corresponding electrode of the last cell and that of the corresponding electrode of the preceding cell in the series, where all of the cathodes in the case of the oxidizing gas, and all of the anodes, in the case of the fuel gas, have the same current density. Besides, the polarization deviation may be measured in terms of the voltage difference between reference electrodes as well as in terms of the voltage difference between various cells of the series.

In accordance with a further embodiment of the invention a process is provided for electrolytically separating an electrochemically convertible reaction gas from a gas mixture additionally containing a gas constituent inert to electrochemical conversion. Thus, the gas mixture may be passed into a fuel battery having a series of successively connected cells equipped with gas diffusion electrodes corresponding to the reaction gas to be electrochemically separated and then successively in series through the corresponding gas diffusion electrodes. In the same way, fresh gas mixtures will be fed to the corresponding electrode of the first cell, and remaining gas mixture passing from the corresponding electrode of a preceding cell will be fed into the corresponding electrode of the next cell in the series. Conveniently, the thereby accumulated gas constituents inert to electrochemical conversion which pass from the corresponding electrode of the last cell may be recovered as desired.

All in all, the present invention permits the accumulation continuously at one point and the expelling automatically of fuel gas contaminants and/or oxidizing gas contaminants without the loss of significant amounts of the gases to be reacted as was the case in the past where venting to the atmosphere was required in order to eliminate inert gas pressure pockets or cushions. By providing an appropriate construction of a battery of fuel gas cells in accordance with the invention, it is now possible advantageously not only to process impure hydrogen electrochemically but even to withdraw selectively hydrogen from hydrogen-containing gas mixtures such as blast furnace gas, city gas, natural gas, etc. This is true since, contrary to previous methods of connecting the gas supply of individual cells of a fuel gas battery in parallel, in accordance with the present invention, the operation with inert gas-containing reaction gases of two cells or multicell fuel batteries, the cells of which are equipped with identical gas diffusion electrodes for the particular gas to be converted, may be carried out by providing the cells in series connected and by passing the particular gas successively in series through the various electrode of the cells. The present invention contemplates the series passage of the fuel gas and/or, if desired, the oxidizing gas through several or all of the individual cells. Advantageously, fresh gas from a source, such as a reservoir, is supplied directly to only the first electrode of the series while each successive electrode thereafter receives only the gas from the gas space of the preceding electrode while the inert gas accumulations pass along the electrode gas spaces and are removed from the last electrode.

It will be appreciated, therefore, that the gas which is to be converted electrochemically by electric load in a given electrode must first flow through the gas spaces of all preceding electrodes. In this manner, the flow velocity of the gas is increased in those gas spaces and consequently the mass transfer between the reaction gas and the electrode is markedly improved. Consequently, a better utilization of the reaction gas is achieved because each molecule of the fuel gas and the oxidizing gas, as the case may be, which is expelled with the inert gas cushions reduces the efficiency of the electrochemical electrode reaction.

As a result of the series arrangement of electrodes in accordance with the invention, the concentrations of inert gas is always highest in the gas space of the last electrode when current is drawn from the battery. Therefore, the last electrode also has the highest polarization within the series at the same current density. Significantly, in order to prevent suffocation effects of the inert gas accumulating in the battery, it is only necessary to supervise the potential of the last electrode. This may be carried out with a non-loaded reference electrode whereby the inert gas cushions may be purged as soon as the potential decreases a predetermined amount.

To accommodate the removal of the inert gas, a valve may be continuously or intermittently arranged to control the flow velocity of the inert purge gas from the last electrode. Such valve may be conveniently actuated in a well known manner, for example by means of a servo motor, or a power magnet may be provided downstream of the gas space of the last electrode of the series for the automatic control of the purging process. The control of the actuating member, i.e. a servo motor or a power magnet, may be carried out by changes in the electrode potential.

It will be appreciated that the polarization of a gas diffusion electrode is composed of two components, one of which is a function of the load and occurs even without the presence of inert gases in the reaction gas while the second component is formed additionally as a result of the decrease in partial pressure of the reaction gas as inert gases are accumulated. It is only the second component, however, which can be utilized for the control of the purging of inert gases in accordance with the invention. For carrying out the purging of the inert gas, in accordance with the foregoing, in a most favorable manner, it is necessary that the first of the polarization components mentioned, which may be referred to as natural polarization, be compensated in any manner. For this purpose, a differential technique is used which takes advantage of the fact that the lowest inert gas concentration prevails in the gas space of the first electrode while the highest inert gas concentration prevails in the gas space of the last electrode. Therefore, at the same current density within the series, the difference of the polarizations of the two electrodes is only a consequence of the accumulation of inert gas in the last electrode.

Accordingly, it is possible by measuring the polarization of the last electrode of the particular series to detect automatically the accumulation of inert gases and in turn to control the purging process. In this way, the natural polarization attributable to the load may be eliminated.

As aforesaid, the polarization effects between the first and last electrodes of the series may be measured suitably and utilized for the control of the purging process by providing a reference electrode before each of the two electrodes and then comparing the voltages obtained. Of course, instead of using special reference electrodes, it is equally possible to employ as comparison electrodes the counter electrodes of the cells themselves, if the danger of a suffocation of the potential by inert gases does not exist for these electrodes.

Referring to the drawing, FIGURE 1 illustrates an embodiment of the invention exemplified by a six cell battery itself controlling the inert gas purging process. The six cells are designated $Z_1$ to $Z_6$, these cells containing respectively the gas diffusion electrodes $E_{11}$, $E_{21}$, $E_{31}$, $E_{41}$, $E_{51}$ and $E_{61}$ as well as the counter electrodes $E_{12}$, $E_{22}$, $E_{32}$, $E_{42}$, $E_{52}$ and $E_{62}$. The gas is supplied to the diffusion electrode $E_{11}$ at 1 and passes in succession through the gas spaces of the other corresponding diffusion electrodes, leaving the battery through a solenoid valve V at 2. All the cells are electrically connected in series. The electric power produced in the battery is passed to the consuming device or load by the current conductors $S_1$ and $S_2$. To control the purging of inert gas, the cell $Z_1$ is connected with one winding and the cell $Z_6$ is connected with the other winding, of a differential relay R, such that the magnetic fields are opposite. This relay R is adjusted such that it responds when the voltages of the cells $Z_1$ and $Z_6$ deviate from each other by a preset amount. As soon as the relay responds to such deviation, the switch S, operatively connected with relay R, closes and the power magnet M receives current from $S_1$ and $S_2$ via the matching resistor W. Magnet M causes valve V to open whereby the inert gas cushion is expelled at 2. The voltage of cell $Z_6$ may then increase again temporarily whereby the relay R is reversed, causing switch S to open and in turn solenoid valve V to close until the renewed formation of an inert gas cushion polarizes the cell $Z_6$. Again the voltage of cell $Z_6$ will drop sufficiently as compared with cell $Z_1$ so that another purging process will become necessary.

FIGURE 2 illustrates an embodiment of an intermittent control system which in most cases is less expensive and simpler to carry out in practice than a continuous system. Continuous purging is to be effected with the use of a valve V, which has a variable resistance to the flow of inert gas and is similarly controlled by the voltage differential of the cells $Z_1$ and $Z_6$.

The natural polarization may also be eliminated with the use of any other cell in place of the first cell of the series, this being even advantageous where both the cathodes and anodes are gas diffusion electrodes having a tendency to suffocate or where both fuel and oxygen are not extremely pure. Thus, in FIGURE 2, a battery having a plurality of, for example $2n$ cells, of which only the first cell Z, a central cell $Z_n$, and a last cell $Z_{2n}$ are shown for the sake of simplicity, these cells being connected in series. The anode $E_1$ of the first cell is supplied with fuel gas at 1. The fuel gas passes in succession through the gas spaces all of the anodes $E_1 \ldots E_{n1} \ldots E_{2n1}$ and leaves the battery through the solenoid valve $V_1$ at 2. In an analogous manner, oxygen is supplied to the cathodes, but in this case, the oxygen enters the cathode of the last cell of the series at 3 in opposite direction to the flow of the fuel gas and then leaves the battery through the solenoid valve $V_2$ at 4. The differential relay $R_1$ is pulled up as soon as the voltage differential of the cells $Z_n$ and $Z_{2n}$ exceeds a preset amount. The relay $R_1$ then closes the switch $S_1$ causing the power magnet $M_1$ to open the valve $V_1$ and purge the inert gas cushions of the fuel gas from the anode $E_{2n1}$ at 2. The relay $R_2$ on the other hand, is pulled up where the deviation of the voltage of the cell Z from that of the cell $Z_n$ is excessively great due to the formation of inert gas cushions in the oxygen before the cathode $E_2$.

In this event, the switch $S_2$ is closed, the power magnet $M_2$ is energized and this, in turn, opens the valve $V_2$ thereby expelling the inert gas cushions of the oxygen or atmospheric oxygen from the cell at 4.

It will be appreciated in accordance with the invention that any gas is considered an inert gas which is not converted electrochemically at the gas diffusion electrode of the cell. Therefore, the present invention contemplates any type of gas diffusion electrodes for any reaction gas and gas mixture. Of course, the inert gas cushions need by no means consist only of gases which are chemically inactive in the same way as argon or nitrogen. Instead, the inert gases contemplated by the invention may contain gas constituents which normally react, even explosively, such as methane, provided that the inert gas constituent of constituents are incapable of being reacted by the catalyst of the particular electrode used in the cell under the reaction conditions, e.g. at the operating temperature. Thus, advantageously, the present invention permits the selective electrochemical removal of hydrogen from a natural gas or cheap industrial waste gas such as $CH_4/H_2$.

Naturally, of course, the oxidizing gas may be air or oxygen in impure form, since the inert gas constituents may be readily separated and removed in accordance with the invention without detriment to the electrolytic conversion contemplated or the separation of the gas mixture as desired.

The automatic control of the purging of the gas may be effected by any desired control device of a conventional nature as the artisan will appreciate, and not merely by the devices specifically herein disclosed. Furthermore, where the inert gas mixture includes gases which are of particular value, as for example from an economic standpoint, for instance rare gases, the same may be collected in the well known manner for application to further uses.

The cells need not to be closed from the atmosphere, since the gases are supplied directly to the gas spaces of the respective electrodes.

*Example 1*

The process according to the invention was operated in a five cell battery, the cells thereof being electrically connected in series. Each cell was provided with $5n$ KOH-solution as electrolyte to which 200 ccm. ethylene glycol per liter were added, and equipped with a double skeleton catalyst electrode consisting of a supporting skeleton with embedded Raney metal granules according to U.S.A.P. 2,928,891 as fuel electrode and an oxygen electrode consisting of carbon with silver as catalyst, the electrodes being immersed into the electrolyte-ethylene glycol mixture.

The oxygen electrodes were supplied with oxygen with slightly increased pressure of 0.1 atm. The oxygen passed in succession through the gas spaces of the oxygen electrodes. Saturated calomel electrodes were provided before the first and the last oxygen electrode in order to control the polarization.

As soon as the polarization values of the oxygen electrodes of the first and last cells deviated from each other for more than 200 mv., the valve at the end of the air line was opened and the nitrogen cushion which had accumulated in the last electrode during operation of the cells was exposed. At 60° C. and a current density of 50 ma./cm.$^2$, the voltage of the battery could be maintained nearly constant at 3.3 to 3.6 volts during several weeks.

*Example 2*

In a three cell oxhydrogen gas battery, the cells thereof being electrically connected in series, each cell was equipped with a double skeleton catalyst electrode having a supporting skeleton of carbonyl nickel with granules of Raney nickel embedded therein as hydrogen electrode and a double skeleton catalyst electrode having a supporting skeleton of carbonyl nickel with granules of Raney silver embedded therein as oxygen electrode. The respective electrodes had a diameter of 40 mm. and were inserted in a holder of Plexigum. The gases were supplied to the respective electrodes at the back side, while the front of the respective electrodes was in contact with 5n KOH-solution as electrolyte. Hydrogen passed in succession through the serially connected cells 1, 2, 3, whereas oxygen passed in opposite direction to the flow of hydrogen. At the exit of each gas line a solenoid valve (Fa. Danfoss, type EVJ3) was provided which normally prevented the escaping of the gases which were supplied to the electrodes with a pressure of one atmosphere gauge. The valve could be opened by a current-impulse.

This current-impulse is released by a fine-relay (Fa. Siemens und Halske). One of the windings of the relay was connected to the terminal voltage of the cell 2 via an adjustable resistance while the other was inversely poled connected with the terminal voltage of the cell 3 (H$_2$-valve) or 1 (oxygen valve).

Inert gas cushions were automatically expelled out of the hydrogen electrode of the third cell as soon as the difference of the terminal voltage of the cells 2 and 3 increase about 200 mv. In an analogous manner, inert gas cushion were expelled from the oxygen side as soon as the voltage difference of the cells 1 and 2 exceeded 200 mv. For operating this battery, not only pure gases were used, but preferably gas mixtures containing high amounts of inert gases.

In order to determine gas losses during the process according to the invention, the automatic valve at the exit of the oxygen line was replaced by a valve adjustable to constant flow velocity. A calomel electrode was interposed before the oxygen electrode of cell 1. The composition of the exhausted gas was determined, when a current was flowing. The hereby determined curves are shown in FIGURE 3. The ordinate shows the electrode potential as function of the current strength. The flow velocity of the exhaust gas is the parameter. The curves 1 to 6 were determined at different flow velocities given in the following table.

| Nr.: | Flow velocity, vo./mm.$^3$/sec. |
|---|---|
| 1 | 290 |
| 2 | 150 |
| 3 | 86 |
| 4 | 42 |
| 5 | 17 |
| 6 | 11 |

In the example, the battery was supplied with a gas mixture consisting of 40% O$_2$ and 60% N$_2$.

The ratio of the exhausted oxygen to the oxygen supplied the so called "loss-coefficient" is shown in thin lines. This example illustrates the complete utilization of the supplied oxygen, if the flow velocity of the exhaust gas is regulated by the potential of the last electrodes before the gas exit.

What is claimed is:

1. Process for operating a fuel battery with an inert gas-constituent-containing reaction gas, said reaction gas being capable of forming ions of a given polarity whereas such inert gas constituents do not ionize, said fuel battery having cells containing a normally liquid electrolyte and equipped with opposing electrodes including gas diffusion electrodes corresponding to the given polarity of said reaction gas to be electrochemically converted, all the electrodes being maintained in contact with the liquid electrolyte, which comprises operating the fuel battery under electrical load while passing the inert gas-constituent-containing reaction gas capable of forming ions of such given polarity successively in series through the corresponding gas diffusion electrodes therefor of at least two series-connected cells for electrochemical dissolution thereat with formation of ions of said given polarity, and electrochemically combining said ions with ions corresponding to the counter-reactant present in the fuel battery to produce electrical energy, fresh inert gas-constituent-containing reaction gas capable of forming ions of such given polarity being fed to the corresponding electrode of the first cell and remaining inert gas-constituent-containing reaction gas capable of forming ions of such given polarity passing from the corresponding electrode of a preceding cell being fed to the corresponding electrode of the next cell in the series, while removing the thereby accumulated inert gas constituents capable of forming ions of such given polarity passing from the corresponding electrode of the last cell, the content of inert gas constituents accumulating at the corresponding electrode of the last cell being directly proportional to the degree of inert gas polarization of said electrode of the last cell and said content being removed upon the reaching of a predetermined inert gas polarization degree thereat.

2. Process according to claim 1 wherein said corresponding electrodes are anodes and said reaction gas is a fuel gas.

3. Process according to claim 1 wherein said corresponding electrodes are cathodes and said reaction gas is an oxidizing gas.

4. Process according to claim 1 wherein the inert gas constituents are removed continuously.

5. Process according to claim 1 wherein the inert gas constituents are removed intermittently.

6. Process according to claim 1, wherein the content of accumulated inert gas constituents is removed automatically in direct dependence upon the reaching of said predetermined polarization degree.

7. Process according to claim 6 wherein the content of accumulated inert gas constituents is removed in direct dependence upon the inert gas polarization deviation between the inert gas polarization of said corresponding electrode of the last cell and the corresponding electrode of a preceding cell in the series, all of said electrodes having the same current density.

8. Process according to claim 7 wherein said content of accumulated inert gas constituents is removed upon the reaching of a predetermined inert gas polarization deviation.

9. Process according to claim 8, wherein said polarization deviation is measured in terms of the voltage difference between the electrode of the last cell of a series and the corresponding electrode of a preceding cell in the series by interposing a reference electrode before the corresponding electrode of the last cell and another reference electrode of the same type before the corresponding electrode of a preceding cell and comparing the voltages of the two electrodes against their reference electrodes.

10. Process according to claim 8 wherein said polarization deviation is measured in terms of the voltage difference between said cells.

11. Process for operating with inert gas-constituent-containing reaction gases a fuel battery having cells containing a normally liquid electrolyte and equipped with gas diffusion electrodes for the oxidizing gas and gas diffusion electrodes for the fuel gas, all of said electrodes being maintained in contact with the liquid electrolyte and such inert gas constituents being inert to ion formation at the corresponding electrodes, which comprises operating the fuel battery under electrical load while passing the inert gas-constituent-containing fuel gas successively in series through the gas diffusion anodes of at least two series connected cells for electrochemical dissolution thereat with formation of corresponding ions, fresh inert gas-constituent-containing fuel gas being fed to the anode of the first cell and remaining inert gas-constituent-containing fuel gas passing from the anode of a preceding cell being fed to the anode of the next cell in the series, while removing the thereby accumulated inert gas constituents passing from the anode of the last cell, the content of inert gas constituents accumulating at the corresponding anode of the last cell being directly proportional to the degree of inert gas polarization of said anode of the last cell and said content being removed upon the reaching of a predetermined inert gas polarization degree thereat, and passing the inert gas-constituent-containing oxidizing gas successively in series through the gas diffusion cathodes of said connected cells for electrochemical dissolution thereat with formation of corresponding ions, fresh inert gas-constituent-containing oxidizing gas being fed to the cathode of the first cell and the remaining inert gas-constituent-containing oxidizing gas passing from the cathode of a preceding cell being fed to the cathode of the next cell in the series, while removing the thereby accumulated inert gas constituents passing from the cathode of the last cell, the content of inert gas constituents accumulating at the corresponding cathode of the last cell being directly proportional to the degree of inert gas polarization of said cathode of the last cell and said content being removed upon the reaching of a predetermined inert gas polarization degree thereat, the ions corresponding to the electrochemically dissolved fuel and the ions corresponding to the electrochemically dissolved oxidant being electrochemically combined in the particular cell with the corresponding production of electrical energy.

12. Process according to claim 11 wherein the direction of flow of the gas passing through the anodes of the series-connected cells of the fuel battery is opposite the direction of flow of the gas passing through the cathodes of said cells.

13. Process according to claim 11 wherein the inert gas constituents are removed continuously.

14. Process according to claim 11 wherein the inert gas constituents are removed intermittently.

15. Process according to claim 11 wherein the oxidizing gas is air and the fuel gas is a hydrogen-containing gas.

16. Process according to claim 11 wherein in the case of the oxidizing gas and the fuel gas, said content of inert gas constituents is removed in direct dependence upon the inert gas polarization deviation between the inert gas polarization of the corresponding electrode of the last cell and that of the corresponding electrode of a preceding cell in the series, all of said anodes having the same current density and all of said cathodes having the same current density.

17. Process according to claim 16 wherein in the case of the oxidizing gas and the fuel gas, said content of inert gas constituents is removed upon the reaching of a predetermined inert gas polarization deviation between the particular electrodes.

18. Process according to claim 17 wherein the inert gas polarization deviation in each case is measured in terms of the voltage difference between the particular electrodes by comparing the voltages obtained by means of a reference electrode interposed before the corresponding electrode of the last cell and a reference electrode interposed before the corresponding electrode of said preceding cell in the series.

19. Process according to claim 17 wherein the inert gas polarization deviation is measured in terms of the voltage difference between said cells.

20. In the process for operating a fuel battery with an inert gas-constituent-containing reaction gas, said reaction gas being capable of forming ions of a given polarity whereas such inert gas constituents do not ionize, said fuel battery having cells containing a normally liquid electrolyte and equipped with opposing electrodes including gas diffusion electrodes corresponding to the given polarity of said reaction gas to be electrochemically converted, all the electrodes being maintained in contact with the liquid electrolyte, the improvement which comprises operating the fuel battery under electrical load while passing the inert gas-constituent-containing reaction gas capable of forming ions of such given polarity successively in series through the corresponding gas diffusion electrodes therefor of a series of successively connected cells for electrochemical dissolution thereat with formation of ions of said given polarity, and electrochemically combining said ions with ions corresponding to the counter-reactant present in the fuel battery to produce electrical energy, said electrodes all having the same current density, fresh inert gas-constituent-containing reaction gas capable of forming ions of such given polarity being fed to the corresponding electrode of the first cell and remaining inert gas-constituent-containing reaction gas capable of forming ions of said given polarity passing from the corresponding electrode of a preceding cell being fed to the corresponding electrode of the next cell in the series, while removing the thereby accumulated inert gas constituents passing from the corresponding electrode of the last cell, the content of inert gas constituents accumulating at the corresponding electrode of the last cell being directly proportional to the degree of inert gas polarization of said electrode of the last cell and said content being removed upon the reaching of a predetermined inert gas polarization degree thereat.

21. Process for electrolytically separating an electrochemically convertible reaction gas capable of forming ions of a given polarity from a gas mixture additionally containing a gas constituent inert to electrochemical conversion, which comprises passing said gas mixture into a fuel battery, operated under electrical load and having a series of successively connected cells containing a normally liquid electrolyte and equipped with opposing electrodes including gas diffusion electrodes corresponding to the given polarity of said reaction gas to be electrochemically separated, and successively in series through said corresponding gas diffusion electrodes therefor, for electrochemical dissolution of said electrochemically convertible reaction gas thereat with formation of ions of said given polarity, and electrochemically combining said ions with ions corresponding to the counter-reactant present in the fuel battery to produce electrical energy, all the electrodes being maintained in contact with the liquid electrolyte, fresh gas mixture being fed to the corresponding electrode of the first cell and remaining gas mixture passing from the corresponding electrode of a preceding cell being fed to the corresponding electrode of the next cell in the series, while recovering the thereby accumulated gas constituent inert to electrochemical conversion passing from the corresponding electrode of the last cell.

22. Improvement according to claim 21, wherein said corresponding electrodes are anodes, and said gas mixture includes hydrogen as electrochemically convertible reaction gas and methane as gas constituent inert to electrochemical conversion, the content of inert gas constituents accumulating at the corresponding anode of the last cell being directly proportional to the degree of inert gas polarization of said anode of the last cell and said content being removed upon the reaching of a predetermined inert gas polarization degree thereat.

References Cited by the Examiner

UNITED STATES PATENTS

| | | | |
|---|---|---|---|
| 409,365 | 8/1889 | Mond et al. | 136—86 |
| 913,390 | 2/1909 | Jungner | 136—86 |
| 2,275,281 | 3/1942 | Berl. | |
| 2,615,931 | 10/1952 | Hatfield | 136—86 |
| 2,901,524 | 8/1959 | Gorin et al. | 136—86 |
| 2,925,455 | 2/1960 | Eidensohn | 136—86 |
| 2,928,891 | 3/1960 | Justi et al. | 136—86 |
| 2,947,797 | 8/1960 | Justi et al. | 136—86 |
| 2,980,749 | 4/1961 | Broers | 136—86 |
| 3,106,494 | 10/1963 | Thorsheim | 136—86 |

FOREIGN PATENTS

| | | |
|---|---|---|
| 17,651 | 1/1929 | Australia. |
| 234,255 | 6/1961 | Australia. |
| 1,236,358 | 6/1960 | France. |
| 848,586 | 9/1960 | Great Britain. |

WINSTON A. DOUGLAS, *Primary Examiner.*

JOHN R. SPECK, JOHN H. MACK, ALLEN B. CURTIS, *Examiners.*

H. FEELEY, *Assistant Examiner.*